July 23, 1940.  G. KENDE  2,208,797
CAMERA
Filed Oct. 27, 1938  2 Sheets-Sheet 1

INVENTOR
GEORGE KENDE
BY
ATTORNEY

July 23, 1940.  G. KENDE  2,208,797
CAMERA
Filed Oct. 27, 1938  2 Sheets-Sheet 2
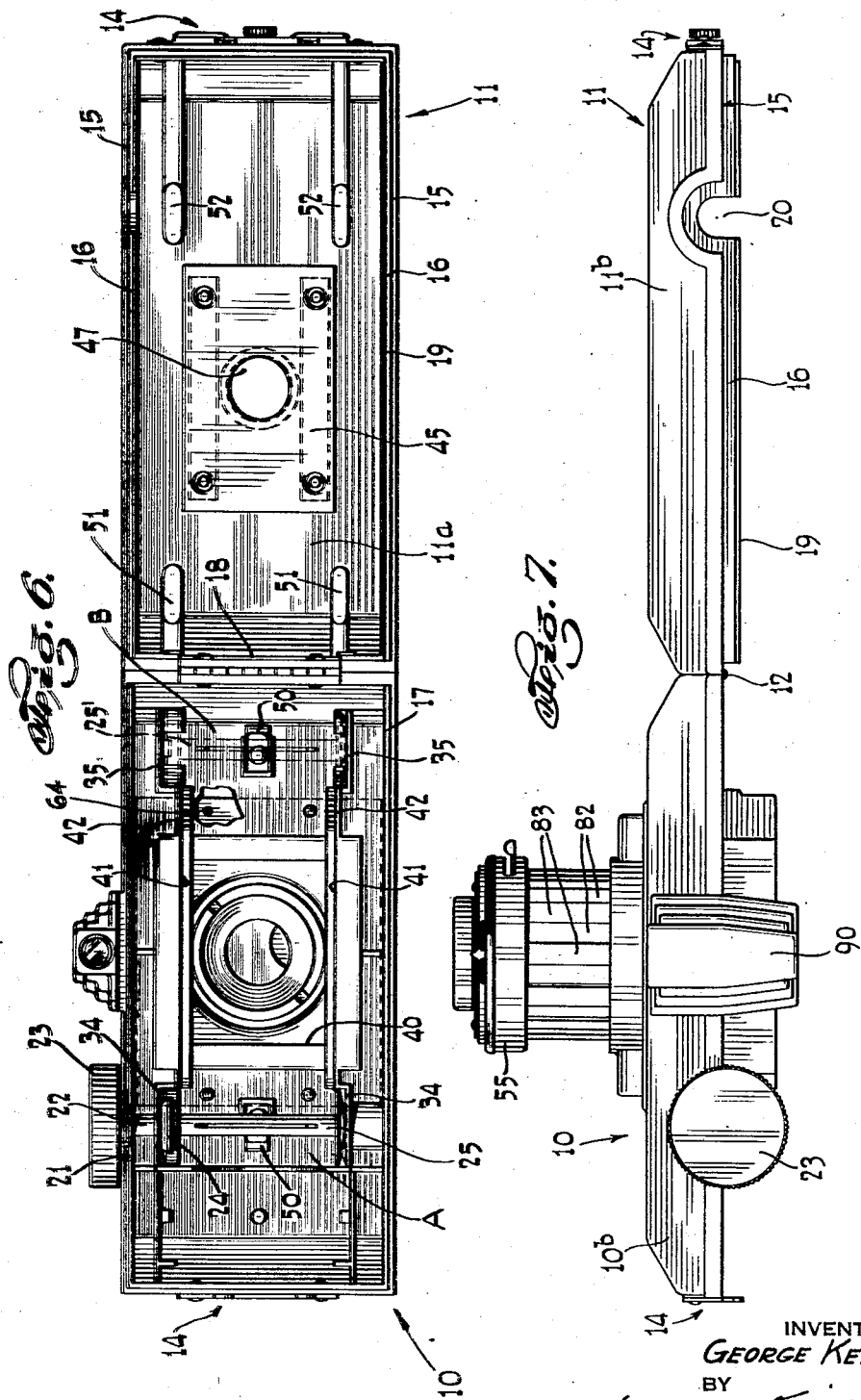
INVENTOR
GEORGE KENDE
BY
ATTORNEY Patented July 23, 1940

2,208,797

UNITED STATES PATENT OFFICE 2,208,797

CAMERA

George Kende, New York, N. Y., assignor to Universal Camera Corporation, New York, N. Y., a corporation of Delaware Application October 27, 1938, Serial No. 237,265

10 Claims. (Cl. 95—31)

This invention relates to cameras and has for one of its objects the provision of an improved camera construction including a novel projectible lens-carrying member.

Another object of my invention is to provide an improved camera construction of the character described which shall comprise relatively few and simple parts, which shall be easy to assemble, which shall be relatively inexpensive to manufacture and yet of sturdy construction, and which at the same time shall operate with a high degree of efficiency.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

In the accompanying drawings, in which is shown one of the various possible embodiments of this invention, Fig. 1 is a front elevational view of a camera constructed in accordance with my invention;

Fig. 6 is an elevational view similar to Fig. 1, but showing the same with the front casing part hingedly swung to open position; and Fig. 7 is a top plan view thereof.

Figure 1:
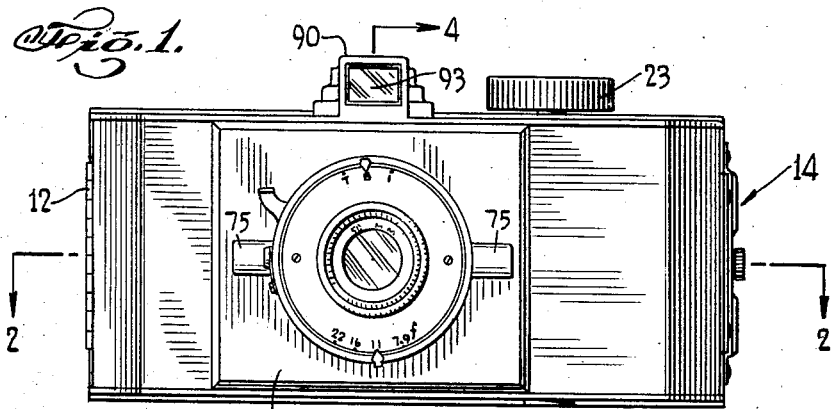

Referring now in detail to the drawings, I have disclosed a camera constructed in accordance with my invention and comprising a casing made up of a front part 10 and a back part 11 interconnected by a hinge member 12 so that the casing parts may be pivotally swung to completely opened position, as shown in Figs. 6 and 7 of the drawings, for the purpose of loading the camera with a suitable roll of film or for any other desired reason. A releasable catch mechanism 14 of any well known design may be employed for maintaining the camera in closed position. The front casing part 10 comprises a bottom wall 10a and surrounding integral up-standing side walls 10b to form the box-like hollow casing part 10. The casing part 11 comprises a bottom wall 11a and surrounding integral up-standing side walls 11b to form the cooperating box-like hollow casing part 11 substantially similar to the casing part 10. The said up-standing side walls 10b and 11b are so designed as to be in registered relationship when contiguously disposed, as in Fig. 2 of the drawings, where the camera is shown in closed position. To render the camera casing light-proof, there may be provided adjacent the upper free edges of the side walls 11b of the casing part 11 a shoulder 15 adjacent an up-standing ledge portion 16, which extends upwardly beyond the shoulder 15 and is offset inwardly from the outer surface of the said walls 11b. The said ledge 16 is designed to be received within the camera casing part 10 adjacent the inner surfaces of the side walls 11b and to rest upon the shoulder 17 disposed at a predetermined distance below the top edge of the side walls 10b, such distance being equal to the distance which the ledge 16 projects above the top edges of the side walls 11b. The shoulder portion 15 of the casing part 11 is at the same time adapted to rest upon the top edge of the side walls 10b to thus form a complete light seal, as clearly shown in Fig. 2 of the drawings. Adjacent portions of the side walls, 10b and 11b, may be cut away to accommodate the hinge 12 which may be suitably attached as shown and a metallic plate 18 is then fixed to the side wall 11b in overlying position with respect to the adjacent hinge part, completely closing the cut-out portion of the wall 11b and projecting upwardly so that the top edge of the plate is flush with the top edge of the ledge 16. To insure additional light-proofing the ledge 16 may be provided with a further upstanding ridge 19 extending slightly above the said ledge 16 and spaced inwardly therefrom, the said ridge 19 being adapted to snugly overlie the portion of the inner surface of the side wall 10b adjacent the shoulder 17.

A portion of the side wall 11b of the casing part 11 is provided with a notch 20 to accommodate a corresponding bracket flange 21 integral with the side wall 10b and designed to have journalled therein a shaft 22 carrying at one end thereof a winding knob 23 of suitable construction well known in the art and having at the opposite end of said shaft 22 a member 24 designed to cooperate with a film wind-up spool 25 to cause rotation of the same. The said film spool 25 and the driving mechanism therefor, above described, may be of any suitable type, such as for example that clearly shown and described in Patent No. 2,029,474, dated February 4, 1936, for Photographic camera.

The bottom wall 10a of the casing part 10 is provided with a substantially rectangular opening 30 (see Figs. 2 and 4) and upstanding integral walls 31 surrounding said opening and projecting inwardly above the top edges of the side walls 10b for a predetermined distance and terminating in a top wall 32. The said walls 31 and 32 form a box-like portion 33 integral with the bottom wall 10a and of such size that when the casing parts 10 and 11 are in closed assembled position, as in Fig. 2 of the drawings, a portion of the said box-like portion 33 will project into the hollow casing part 11. In such position the wall 32 will be disposed at a predetermined spaced distance from the bottom wall 11a of the casing part 11.

The above described box-like portion 33 is provided with outwardly projecting integral walls 34 and 35 (see Fig. 6) disposed in a direction parallel to and spaced from the opposite side walls 10b to form film chambers A and B designed to receive therein the take-up spool 25 and the take-off spool 25′, respectively. The top wall 32 is provided with a film aperture 40 of suitable size depending upon the size of the film employed. The said film F is adapted to be unwound from the spool 25′ and after passing over the aperture 40, to be rewound on the spool 25 by means of the knob 23 hereinbefore described. The outer surface of the wall 32 may be provided with a slightly recessed portion 41 (Fig. 6) surrounding the aperture 40 and defining a pair of ridges 42 designed to guide the film F in its path of travel so that it will always be properly aligned with respect to and directly over the film aperture 40.

A suitable film pressure plate 45 resiliently urged into contact with the unsensitized surface of the film F by means of the springs 46 is interposed between the wall 32 of the box-like portion 33 and the bottom wall 11a of the casing part 11. The pressure plate 45 is provided with an aperture 47 designed to register with a window opening 48 in the wall 11a, through which the film numberings may be viewed by the operator. A suitable colored window member 49 of the type well known in the art is mounted so as to cover the opening 48 and to shut out harmful light rays. A resilient annular washer 53 may also be suitably disposed between the wall 11a and the pressure plate 45 surrounding the opening 48, to further prevent light leakage.

Suitable resilient members 50 may be mounted in each of the film chambers A and B designed to maintain the film F on the spools 25 and 25′ in proper tension.

Suitably disposed pairs of ribs 51 and 52 (see Figs. 2 and 6) extending upwardly from the inner surface of the bottom wall 11a of the casing part 11 are provided to prevent displacement of the spools 25 and 25′ within the chambers A and B during the operation of advancing the film after a picture has been taken. When the casing parts 10 and 11 are in closed position, the said ribs 51 and 52 will be disposed adjacent the flanges of the spools 25 and 25′, as clearly shown in Fig. 2 of the drawings.

Figures 3, 4:
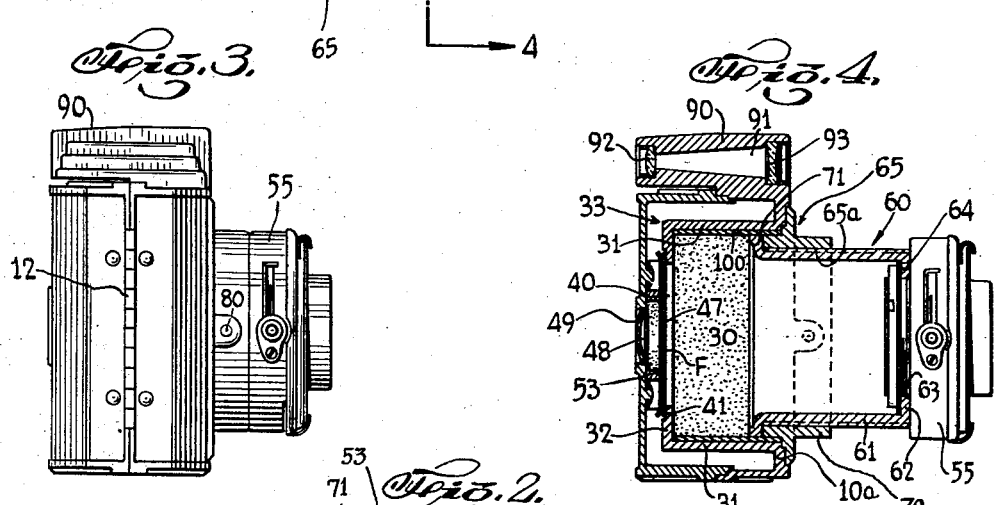
Fig. 3 is an end elevational view of the camera illustrated in Fig. 1.
Fig. 4 is a cross-sectional view taken substantially on the line 4—4 of Fig. 1.
Figure 2:
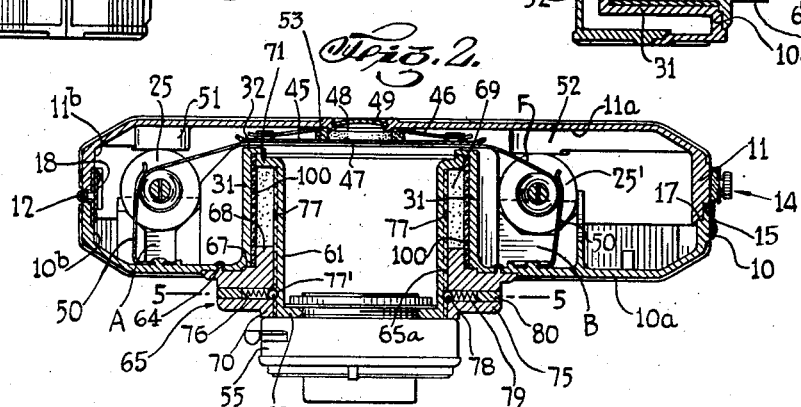
Fig. 2 is a cross-sectional view taken substantially on the line 2—2 of Fig. 1.
Figure 5:
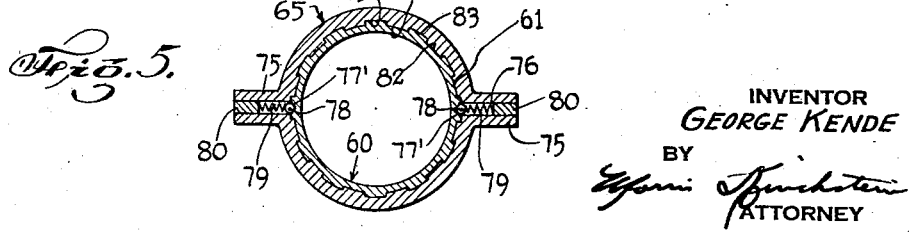
Fig. 5 is a cross-sectional view taken substantially on the line 5—5 of Fig. 2.

Designed to cooperate with the film aperture 40 to photographically impress an image on the sensitized film F, I provide a lens and a shutter mechanism of any suitable design known to the art and suitably mounted in a housing 55. Rigidly attached to the housing 55 for movement therewith is a lense tube 60 comprising an annular wall 61 terminating in the forward end thereof in an inwardly disposed flange 62, received in a corresponding circular recess 63 in the housing 55, as clearly shown in Figs. 2 and 4. A rivet or pin 64 passing through the flange 62 and a portion of the housing 55 serves to prevent relative axial rotational movement between the housing 55 and the lens tube 60. In order for the lens in the housing 55 to be properly spaced from the portion of the film F adjacent the aperture 40, the said lens tube 60 is slidably mounted in a collar member 65 fixed to the wall 10a of the casing part 10 by any suitable attaching means such as for example the rivet pins 64 integrally die cast with the collar 65. The collar 65 is provided with an aperture 65a designed to slidably receive the wall 61 of the lens tube 60 therein. The member 65 is provided with an embossed area 67 on the inner surface thereof adapted to fit in a correspondingly recessed area surrounding the opening 40 in the wall 32, as clearly shown in Fig. 2. There is also provided a protruding portion 68 at the rear surface of said member 65 adjacent the opening 65a and designed to be interposed in the space 69 between the walls 31 and 61. The member 65, the raised area 68 and the portion 69 may be of rectangular peripheral contour, as shown in the drawings, or, if desired, they may be made of any other suitable shape. When the member 65 is properly fixed to the wall 10a, by means of the rivets 64, the lens tube 60 together with the housing 55 will be free to slidably move in a direction axially of the opening 65a. The distance to which the tube 60 may be slidably moved inwardly of the camera is limited by the housing 55, which is designed to be larger in diameter than the lens tube 60 and which abuts the flange shoulder 70 on the member 65. This position, as shown in Fig. 2, is the innermost position to which the housing 55 may be slidably moved, such position placing the lens in an ineffective or out of focus position with respect to the film aperture 40 for taking pictures. The camera is so designed that when it is desired to effectively use the same, the lens tube 50 must be slidably withdrawn from the position shown in Figs. 2 and 3 to a position such as shown in Figs. 4 and 7. In order to limit such outward movement of the lens tube 60 and the housing 55, the annular wall 61 of the said tube 60 is provided, at the end opposite from that of the flange 62, with an outwardly disposed flanged portion 71. Such flanged portion is preferably of rectangular shape and corresponds in peripheral contour to the cross-sectional contour of the box-like portion 33. The inner surface of the flange portion 71 is designed to abut the inner surface of the portion 68 of the member 65 and to thus prevent further outward sliding movement of the lens tube 60 and housing 55. In such position, the lens is properly distanced from the film F adjacent the film aperture 40 for taking pictures. To reduce frictional wear due to the sliding action of the lens tube 60, the inner surface of the wall 31 may be lined with a resilient material 100 such as felt.

To prevent undesirable sliding movement of the lens tube 60 when in such last named extended position, the following releasable holding means are provided. Extending horizontally on opposite sides of the annular flange portion 70 are a pair of lugs 75. The said lugs 75 are provided with aligned longitudinally disposed through apertures 76. A slight detent 77 is also provided in the outer surface of the wall 61 of the tube 60 on diametrically opposite sides thereof, said detents 77 being designed to be in register with the openings 76. After the tube 60 is properly slidably mounted on the member 65, a small steel ball 78 is placed in each opening 76 after which a spring 79 is also inserted. A suitable plug member 80 is then inserted in the aperture 76 to retain the spring 79 under compression so as to normally urge the ball 78 into engagement with and to be received in the detent 77 in the wall 61 of the tube 60. It is thus seen that when the lens tube 60 is slidably moved to its outermost position, as shown in Figs. 4 and 7, it will be held in such position against undesirable sliding displacement by means of the spring pressed balls 78 and the detents 77. After a picture has been taken and it is desired to collapse the lens tube 60, it may be slidably moved to its innermost position, as shown in Figs. 2 and 3 against the force of the spring 79. My camera construction is so designed that when the lens tube 60 is in such innermost position, it is releasably held by means of a second pair of diametrically aligned detents 77' properly disposed in the outer surface of the wall 61.

To prevent undesirable relative axial rotation and lateral movement between the lens tube 60 and the camera casing, the following construction is provided. The outer surface of the wall 61 of the tube 60 is provided with a plurality of circumferentially spaced longitudinal notches 82, and a plurality of circumferentially spaced longitudinal ridges 83 between said notches. The inner surface of the wall surrounding the opening 65a in the member 65 is correspondingly provided with a plurality of circumferentially spaced longitudinal notches 85 and a plurality of alternately spaced ridges 84. The ridges 83 of the tube 60 are designed to be received in corresponding notches 85 in the member 65 while the ridges 84 in the said member 65 are designed to be received in the notches 82 of the tube 60. It is thus seen from the above described construction that there is no possibility of either lateral movement or relative axial rotation between the housing 55 carrying the lens and shutter mechanism and the camera, and thus there is prevented improper focusing and resulting faulty pictures.

In accordance with my invention, the following finder device is provided, which may comprise a portion 90 integrally cast with the casing wall 10b (see Fig. 7) and having a portion thereof projecting beyond said wall 10b and adapted to freely overlie a portion of the corresponding wall 11b of the casing part 11. The portion 90 is provided with a through opening 91 of tapered construction, as shown in Fig. 4, and having mounted at the opposite ends thereof suitable lenses 92 and 93 of the type of construction generally employed in the art. The longitudinal axis of the finder 90 is adapted to be parallel and in alignment with the optical axis of the camera.

It will thus be seen that there is provided a device in which the several objects of this invention are achieved, and which is well adapted to meet the conditions of practical use.

As various possible embodiments which might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. In a camera of the character described, the combination of a casing having an opening therein, a rigid lens tube, said lens tube being axially slidably movable in said opening with respect to said casing, and means for preventing axial rotational movement of said lens tube in said opening, said last named means comprising a plurality of longitudinal notches circumferentially disposed in the outer wall of said lens tube and cooperating ridges in the wall surrounding said opening received in said notches.

2. In a camera of the character described, the combination of a pair of casing parts, the first of said casing parts being provided with a circular lens opening and a box-like portion surrounding said lens opening, said box-like portion projecting inwardly toward the other of said casing parts, circumferentially spaced ridges in the wall surrounding said lens opening, an annular lens tube mounted in said first casing part for sliding axial movement with respect to said lens opening, the outer surface of said lens tube being provided with circumferentially spaced notches or recesses corresponding to and slidably receiving said ridges for preventing rotational movement of said lens tube with respect to said casing, means for limiting the movement of said lens tube in an outward direction away from said first casing part, said last named means comprising a flange at the inner end of said lens tube, said flange being larger than said casing lens opening, and means for releasably retaining said lens tube in said last named outward limited position.

3. In a camera of the character described, the combination of a pair of casing parts, the first of said casing parts being provided with an opening, and a box-like portion surrounding said opening, said box-like portion projecting inwardly toward the other of said casing parts, a plate having a circular opening in alignment with said casing opening, means for attaching said plate to said first casing part, said plate having a portion extending inwardly of said camera, an annular lens tube mounted in said plate opening for axial movement into and away from said box-like portion, a flange on said lens tube adapted to abut said inwardly extending portion of said plate to limit the outward sliding movement of said lens tube, and means for preventing relative axial rotational movement between said lens tube and said plate, said last named means comprising portions on said lens tube mating with corresponding portions in the wall of said plate opening.

4. In a camera of the character described, the combination of a pair of casing parts, the first of said casing parts being provided with an opening, and a box-like portion surrounding said opening, said box-like portion projecting inwardly toward the other of said casing parts, a plate having a circular opening in alignment with said casing opening, means for attaching said plate to said first casing part, an annular lens tube mounted in said plate opening for axial movement into and away from said box-like portion, and means for preventing relative axial rotational movement between said lens tube and said plate opening, said last named means comprising a ridge in the surrounding wall of said plate opening and a cooperating notch in the outer wall of said lens tube, said ridge being transversely disposed and coextensive with said surrounding wall of said plate opening and said notch being parallel to said ridge and coextensive with said outer wall of said lens tube.

5. In a camera of the character described, the combination of a pair of casing parts, the first of said casing parts being provided with an opening, and a box-like portion surrounding said opening, said box-like portion projecting inwardly toward the other of said casing parts, a plate having a circular opening in alignment with said casing opening, an annular lens tube mounted in said plate opening for axial movement into and away from said box-like portion, and means for preventing the rotational movement of said lens tube in said opening, said last named means comprising portions on said lens tube mating with corresponding portions in the wall of said plate opening.

6. In a camera of the character described, the combination of a pair of casing parts, the first of said casing parts being provided with an opening, a member fixedly mounted on said last named casing part, said member having a circular opening communicating with and in optical alignment with said casing opening, an annular lens tube axially slidable in said member opening, the outer surface of the wall of said lens tube being provided with circumferentially spaced longitudinal notches or recesses in a direction parallel to the axis of said lens tube and the wall surrounding said circular member opening being provided with circumferentially spaced longitudinal ridges corresponding to and received in said notches or recesses to prevent relative axial rotational movement between said lens tube and said member at all times.

7. In a camera of the character described, the combination of a pair of casing parts, the first of said casing parts being provided with an opening, a member fixedly mounted on said last named casing part, said member having a circular opening communicating with and in optical alignment with said casing opening, an annular lens tube axially slidable in said member opening, a portion of said member surrounding said circular opening extending inwardly of said casing and a portion extending outwardly of said casing to provide a better supporting surface for said slidable lens tube, the outer surface of the wall of said lens tube being provided with circumferentially spaced longitudinal notches or recesses in a direction parallel to the axis of said lens tube and the wall surrounding said circular member opening being provided with circumferentially spaced longitudinal ridges corresponding to and received in said notches or recesses to prevent relative axial rotational movement between said lens tube and said member at all times.

8. In a camera of the character described, the combination of a pair of casing parts, the first of said casing parts being provided with an opening, a member fixedly mounted on said last named casing part, said member having a circular opening communicating with and in optical alignment with said casing opening, an annular lens tube axially slidable in said member opening, a portion of said member surrounding said circular opening extending inwardly of said casing and a portion extending outwardly of said casing to provide a better supporting surface for said slidable lens tube, the outer surface of the wall of said lens tube being provided with circumferentially spaced longitudinal notches or recesses in a direction parallel to the axis of said lens tube and the wall surrounding said circular member opening being provided with circumferentially spaced longitudinal ridges corresponding to and received in said notches or recesses to prevent relative axial rotational movement between said lens tube and said member at all times, said lens tube being provided with an outwardly extending flange at the inner end thereof adapted to contactively engage the said member portion extending inwardly of said casing to limit the outward sliding movement of said lens tube, said last named position being the picture taking position.

9. In a camera of the character described, the combination of a pair of casing parts, the first of said casing parts being provided with an opening, a member fixedly mounted on said last named casing part, said member having a circular opening communicating with and in optical alignment with said casing opening, an annular lens tube axially slidable in said member opening, a portion of said member surrounding said circular opening extending inwardly of said casing and a portion extending outwardly of said casing to provide a better supporting surface for said slidable lens tube, the outer surface of the wall of said lens tube being provided with circumferentially spaced longitudinal notches or recesses in a direction parallel to the axis of said lens tube and the wall surrounding said circular member opening being provided with circumferentially spaced longitudinal ridges corresponding to and received in said notches or recesses to prevent relative axial rotational movement between said lens tube and said member at all times, said lens tube being provided with an outwardly extending flange at the inner end thereof adapted to contactively engage the said member portion extending inwardly of said casing to limit the outward sliding movement of said lens tube, said last named position being the picture taking position, and means for releasably retaining said lens tube in said picture taking position, said means comprising a lug extending outwardly from said outwardly extending member portion, an aperture in said lug communicating with an aperture in said outwardly extending member portion, a spring pressed ball in said last named two apertures and a detent in the outer surface of said lens tube adapted to receive said ball.

10. In a camera of the character described, the combination of a casing, a circular lens tube mounted in said casing, said lens tube being axially movable with respect to said casing, and means comprising a splined connection for preventing axial rotational movement of said lens tube with respect to said casing, said splined connection comprising a plurality of circumferentially disposed alternate longitudinal grooves and projections on said lens tube, said grooves and said projections being coextensive with said lens tube, and a plurality of mating grooves and projections on said casing.

GEORGE KENDE.